United States Patent [19]

Öberg et al.

[11] Patent Number: 4,480,800
[45] Date of Patent: Nov. 6, 1984

[54] APPARATUS FOR REELING FLOATING BOOMS, PARTICULARLY SUCH AS ARE SELF-EXPANDING

[75] Inventors: Per O. Öberg; Seth A. O. Österlund, both of Nordmaling, Sweden

[73] Assignee: Sanera Projecting Aktiebolag, Nordmaling, Sweden

[21] Appl. No.: 450,498

[22] Filed: Dec. 16, 1982

[30] Foreign Application Priority Data

Dec. 23, 1981 [SE] Sweden .............................. 8107776

[51] Int. Cl.³ ........................ E02B 15/04; B65H 75/02
[52] U.S. Cl. .................................. 242/55; 242/67.1 R; 405/68; 210/923
[58] Field of Search ...................... 242/55, 54 A, 86.2, 242/105, 67.1 R; 254/326, 335, 415; 210/923; 405/66, 67, 68, 69

[56] References Cited

U.S. PATENT DOCUMENTS

| | | | |
|---|---|---|---|
| 3,539,013 | 11/1970 | Smith | 405/66 X |
| 3,563,036 | 2/1971 | Smith et al. | 405/69 |
| 4,089,178 | 5/1978 | Kinase et al. | 405/66 |
| 4,123,911 | 11/1978 | Finigan et al. | 405/68 |
| 4,311,109 | 1/1982 | Webb | 210/923 X |

FOREIGN PATENT DOCUMENTS 424204  7/1982  Sweden .

Primary Examiner—Stuart S. Levy
Assistant Examiner—David Werner
Attorney, Agent, or Firm—Flynn, Thiel, Boutell & Tanis

[57] ABSTRACT

The apparatus comprises a turntable plate arranged on a platform (1), there being tube means (6) mounted on the plate such as to form a conical shape with the aid of a bolted joint (7). To one side of the turntable plate (3) there are arranged on the platform three rollers (12,13,14) and on another part thereof there is arranged a feed roller (29) and guide rolls (31,32). The roller (29) and guide rolls (31,32) are adjustable in two planes in relation to the platform (1). For winding up a boom it is taken between the rolls (31,32) over the feed roller (29) and over the rollers (12,13,14), where the expansion means are flattened so that the boom is wound up in a flattened condition on the tube means (6) forming the conically shaped winding bobin.

16 Claims, 5 Drawing Figures

APPARATUS FOR REELING FLOATING BOOMS, PARTICULARLY SUCH AS ARE SELF-EXPANDING

Today, it is usual in conjunction with oil-fighting efforts to use so-called self-expanding booms, i.e. booms which in their floating bodies include expansion means for expanding after liberation to given the floating bodies their form. Such means are suitably given a structure on the pantograph principle, e.g. as apparent from the Swedish Patent 348 249, which in readiness for laying out assumes a substantially flat shape.

In practice it has been found that gathering together the expansion means and flattening the floating bodies after use is a relatively time-consuming procedure, independent of whether it is the invention to store the boom in a folded packaged condition or rolled up. The air enclosed by the floating bodies must be evacuated in some way, simultaneously as the expansion means are brought into a flat state and kept in this state. Air evacuation has been done with the aid of vacuum cleaners or like means in some cases, while the expansion means have suitably been collapsed by hand.

Since it is usual that each oil-fighting station, e.g. under the auspices of the coast guard organization, has its own set of booms in readiness, it is important that the booms are brought once again into a condition of readiness as soon as possible after a cleaning-up operation has been carried out, so that they can be used again, since an emergency can arise at very short notice.

The present invention relates to an apparatus for bringing booms of the type mentioned above to a condition of readiness in a simple way, i.e. from a fully expanded condition to rolled-up shape, both the evacuation of air and collapse of the expansion means as well as reeling being done in one series of operations.

In the Swedish Patent Application 7811245-5 there is proposed a reeling device for booms of the kind in question, which operates with a horizontal winding shaft. However, it has been found in practice that although this device functions very well, handling the boom after winding has caused certain problems. As will be appreciated, the fabric or so-called skirt hanging down from the floating body is provided with weights along its bottom edge, for keeping the boom in its proper floating position and ensuring the necessary isolation of the oil patch which is to be cleaned up. It is usual to sew a chain of suitable size into the bottom edge of the skirt, and this chain then serves as a stiffening element as well as a weight. When a boom is wound up into a round bundle the lower edge of the skirt with its chain will of necessity be reeled up along one side of the bundle, which means that the weight on this side will be large. Handling problems in conjunction with lifting and transporting the bundle will thus be considerable. Proposals have therefore been made to wind up the boom about a vertical axle so that the chain portion comes at the bottom of the ready bundle. The problem appears to be simple to solve, but practical tests have shown that the device carrying out the winding must have certain characteristics if the desired winding result is obtained.

The present invention proposes an apparatus solving the problems in question, when winding up booms about a vertical shaft or bobin. The inventive apparatus also provides compression of the floating bodies in conjunction with winding in a manner well suited for the purpose.

What is characterizing for the present invention will be apparent from the following claims.

The invention will now be described in detail with reference to the appended drawings illustrating an embodiment thereof.

Figure 1:
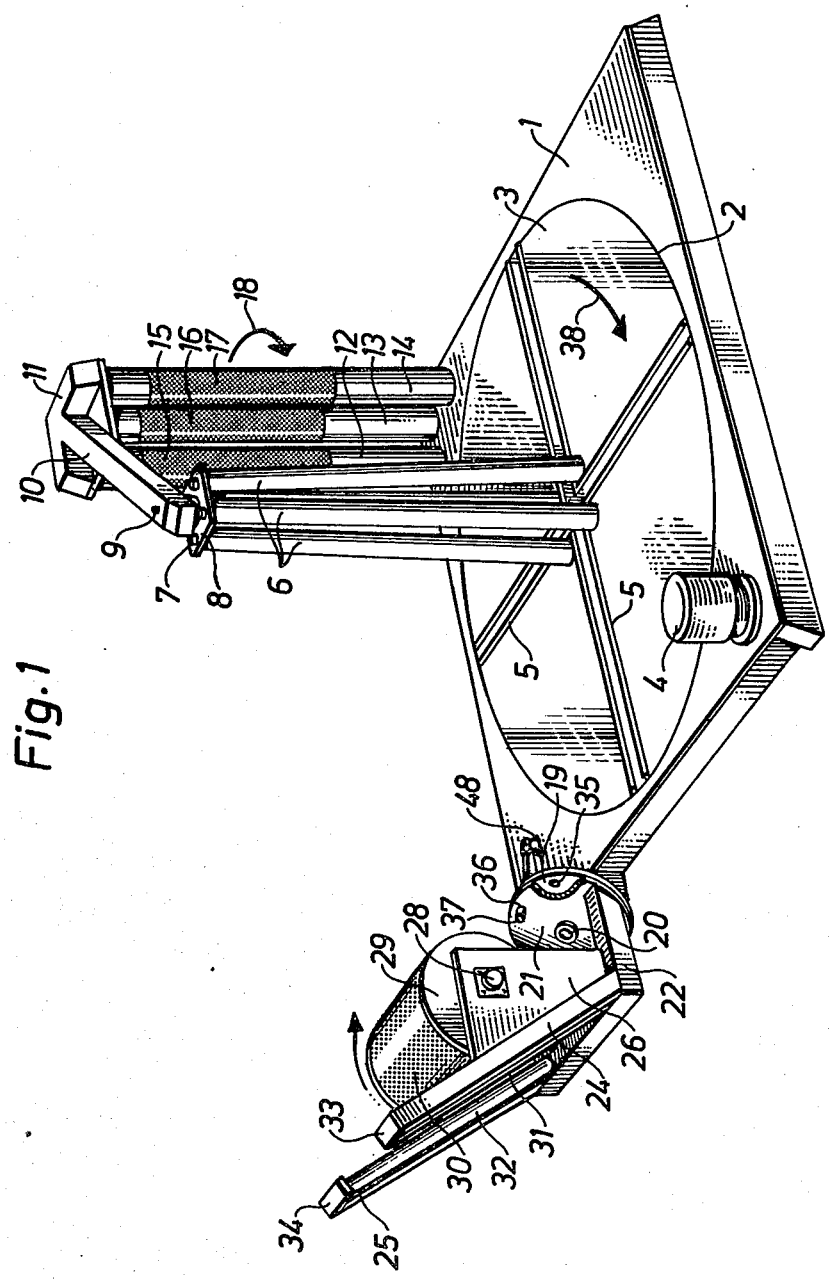
FIG. 1 is a perspective view of an apparatus in accordance with the invention.

The illustrated apparatus comprises a platform 1 provided with a circular recess 2, in which a turntable 3 is rotatably mounted in a manner not more closely illustrated. The turntable is adapted for driving via an unillustrated transmission by a motor 4 mounted on the platform 1. The turntable plate is provided with radial support ribs 5 in pairs, partly for reducing the friction of the boom edge against the plate, and partly to form grooves for the bundling tapes required for keeping together the subsequently reeled-up boom bundle. Four tubes 6 are mounted at the centre of the plate to form a winding bobin. As will be seen from FIG. 1, the tubes 6 are mounted so that together they form a conical winding bobin, said tubes being attached to the turntable plate 3 by bolted joints 7 running from a top plate 8 down through the tubes to the turntable plate 3, in which they are threaded. The top plate 8 carries a central pin 9, removably accommodated in an arm 10 with an outer end 11 formed as an arrowhead. This arrowhead shape enables mountings for three cylindrical rollers 12, 13, 14, each of which is partially coated with a friction coating 15, 16, 17, e.g. of rubber. The rollers 12, 13, 14 are rotatable as illustrated by the arrow 18. The plate 3 and rollers 12, 13, 14 are not in any mutual driving relationship.

At one corner edge of the platform 1, a disc 19 is mounted with its plane at an angle to the surface of the platform 1. The mounting of this disc will be described in detail in conjunction with FIG. 4. A further disc 21 is mounted in a bearing 20 at the centre of the disc 19, the disc 21 in turn carrying a structure comprising two arms 22 and 23, respectively carrying two members 25, 24 at their outer ends.

The pairs of arms and members 22, 25 and 23, 24 each carry a side plate 26, 27, respectively provided with bearings 28 for a feed and arresting roller 29, having a frictional layer 30, e.g. of rubber, on its cylindrical surface. Along the mutually opposing sides of the members 24, 25 there are respectively mounted guide rolls 31, 32 journalled in end plates 33, 34 at the free ends of the members 24, 25, the bottom ends of said rolls being journalled in a manner not more closely illustrated. The disc 19 is provided with a plurality of holes 25 for coaction with a locking pin passing through a hole 36 in the plate 21. As will be seen, the whole of the structure carrying the arresting roller 29 can be turned into different attitudes about the bearing 20 and maintained in a desired position. The alteration in attitude of the structure will be described in conjunction with FIG. 4. The function will otherwise be apparent from the following description. The following mode of operation is applicable for winding up a boom.

It is assumed that the platform 1 is placed at the edge of a quay or the like which the feed and arresting roller 29 somewhat outside the edge thereof. It is further assumed that to start with the roller 29 and its carrying structure assumes a position illustrated in FIG. 1. A rope attached to one end of the boom is taken in between the guide rolls 31 and 32 and over the roller 29. The rope is then taken round the cylindrical rollers 12, 13, 14 and in towards the tubes 6 forming the winding bobin, to which the rope is removably attached.

The motor 4 is then started, causing the turntable to rotate in the direction illustrated by the arrow 38. The roller 29 will rotate in the direction of the arrow 39, and the rollers 12, 13, 14 in the direction of arrow 18. The rope is thus wound up on the tubes 6 and the boom is drawn in towards the roller 29.

Figure 2:
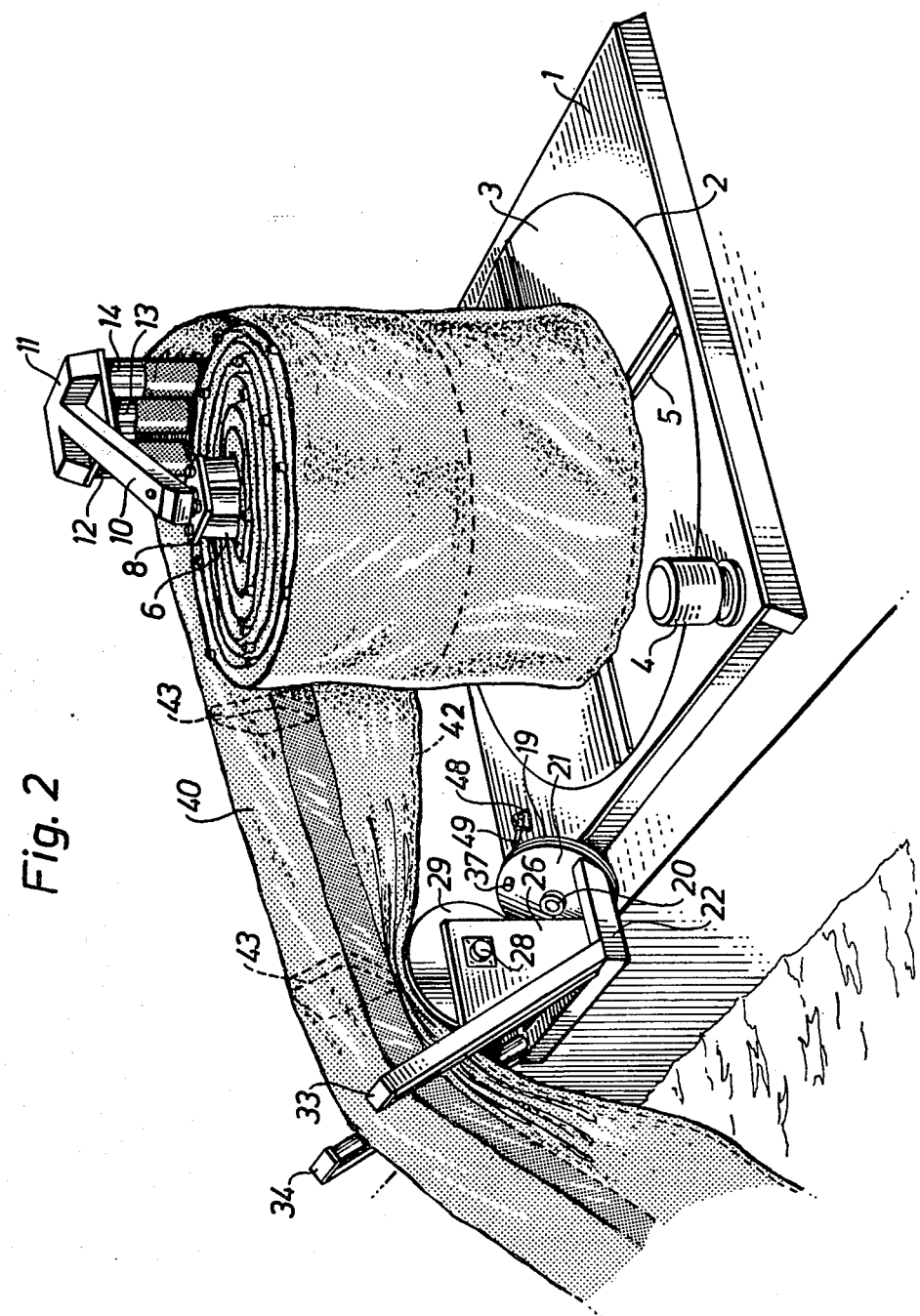
FIG. 2 illustrates the same apparatus as a boom is being reeled.

As will be seen from FIG. 2, the boom 40 with its skirt portion 41 provided with chain 42 at its bottom edge will run over the roller 29, rollers 12, 13, 14 and be reeled up on the tubes 6.

The boom is of the type provided with expansion means 43, indicated by dashed lines, in the form of pantograph structures. This results in that the elongate floating body has a quadratic cross section in an expanded state. In conjunction with reeling up, it is of importance that the expansion means of the boom are pressed together so that the boom is given a substantially flat shape. As will be seen from FIG. 3, this compression takes place substantially about the rollers 12, 13, 14. To provide this compression it is necessary that suitably matched friction is achieved at the passage of the boom over the roller 29. The distance between the rolls 31 and 32 is set so that the floating body of the boom in a non-expanded state can be guided in between the rolls together with the skirt portion 41. However, the distance between the rolls is such that the skirt portion is crumpled together and thus comes against the frictional surface 30 of the roller 29 with great friction. Due to the pull over the roller 29, the expansion means will tend to collapse. By applying braking force to the roller 29, the boom will be stretched over the rollers 12, 13, 14, stretching during the continued reeling-up of the boom will be so heavy that the expansion means are flattened out. With the aid of the roller 29 the boom is guided in so that the body of the boom with the expansion means will arrive at approximately the upper portion of the rollers 12,13,14, which is provided with friction coating. The result of this is that during the operation of compressing the expansion means the skirt portion 41 with its chain 42 will straighten itself out and hang freely down until the expansion means is entirely compressed, whereon the skirt portion will also lie against the last roller in the row, namely the roller 14. The boom is thus rolled up on the turntable in its flattened state under constant tension.

Figure 5:
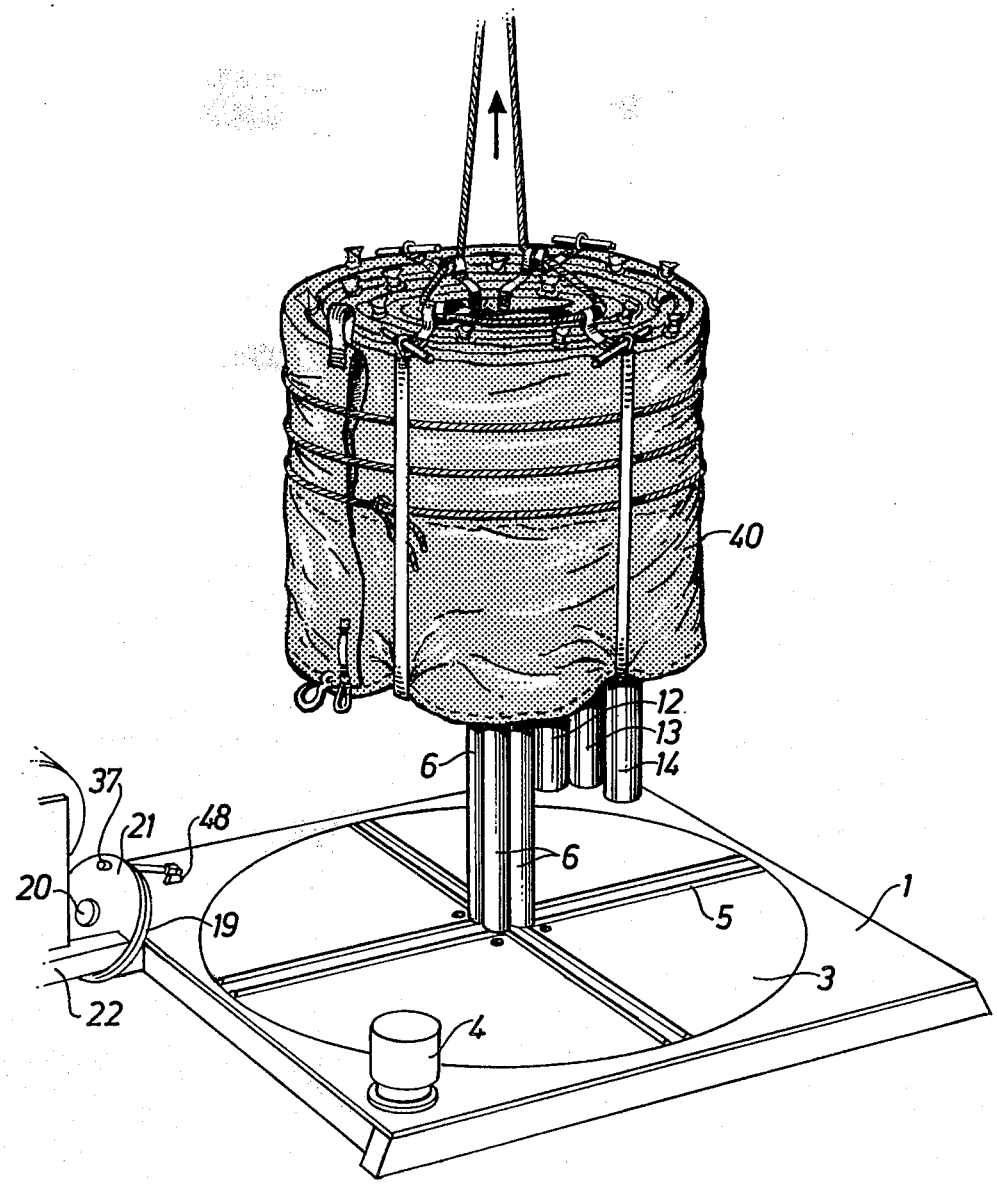
FIG. 5 is a perspective view of raising the ready-wound boom bundle.

When the whole of the boom has been reeled up, rope or tying bands are inserted in the grooves between the ridges 5, round the reeled boom, and tied to keep the boom as a bundle. The arm 10 is then taken from the pin 9 and the bolted joints 7 are unscrewed so that they are free from their attachment to the turntable plate. When this is accomplished, the tubes are urged from their conical attitude to an upright attitude, illustrated in FIG. 5, by the compression in the centre of the boom bundle. The tubes 6 are now quite free and can remain in the bundle or be easily lifted therefrom. As will be seen from FIG. 5, the boom can easily be lifted from the turntable plate by slings and in such a condition that it is ready for reuse.

Figure 3:
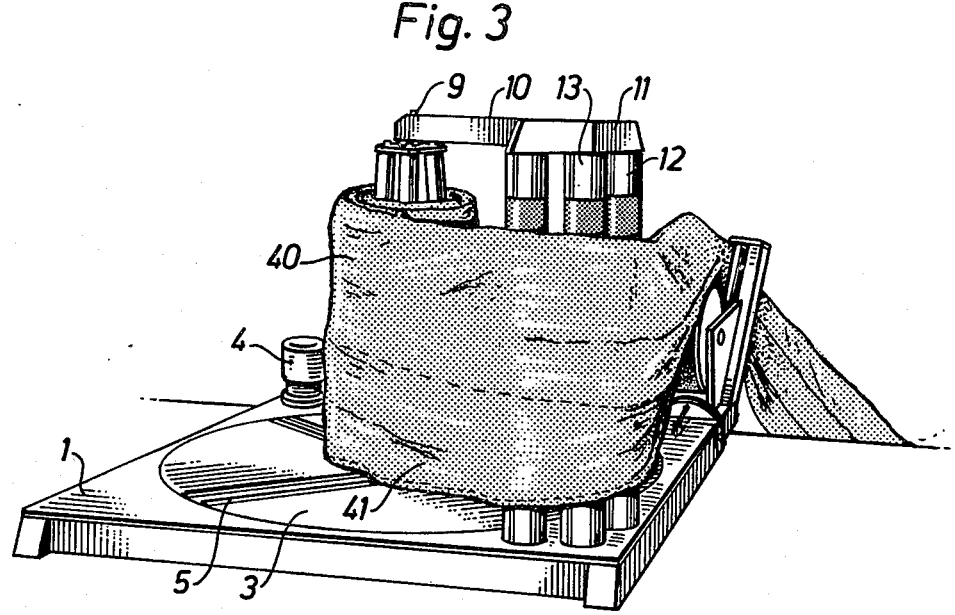
FIG. 3 illustrates in perspective a view of the same operation as in FIG. 2 but from another point of view.

As is clearly apparent from FIG. 3, it is quite often the case that the bottom must be reeled in from a direction deviating from the one the boom assumes between the roller 29 and rollers 12, 13, 14. A certain amount of oblique pull can naturally be taken up by the rolls 31, 32 but is should be noted that the stresses can be very large, especially for booms intended for use in the open sea. In order to allow the boom to act against the roller 29 and its surface coating 30 as far as possible, the whole structure carrying the roller 29 is rotated about the shaft 20 until the roller has come into an angular attitude allowing it to take up substantially all of the force the boom excercises during winding. In such a position (not shown) the discs 19 and 21 are locked to each other by the pin 37 being passed through mutually registering holes in the discs. In this connection it may be mentioned that the roller 29 must occasionally take up considerable forces if the plant is used on a so-called offshore platform. In such cases the lifting height is about 30 meters, and if a sea boom is used, which weighs about 12 kg per meter the total weight during the lift will be about 360 kg. This means that no braking force will generally be necessary on the roller 29, and when the boom rolls in over the roller the expansion means 43 will already be flattened out at this stage. As will be seen, it is of importance that the roller 29 can be adjusted to suit the different directions occurring during reeling in the boom. Binding due to wedging action will otherwise easily occur at the rolls 31 or 32.

Figure 4:
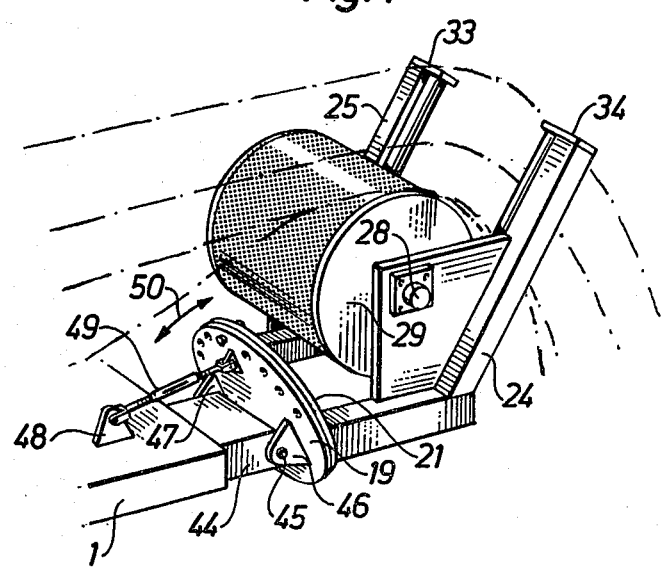
FIG. 4 is a perspective view of a detail of the input and arresting roller structure.

Especially when reeling in booms from great heights above the water it is particularly important that the boom bundle wound round the tubes 6 is as uniform as possible. When there are large pulling forces, the boom can easily be pulled crooked, which results in badly shaped bundles. For remedying this condition, inter alia, the disc 19 is pivotably attached to the platform, as illustrated in FIG. 4. This attachment is adapted such that a substantially rectangular bracket 44 projects out from the platform 1 and is provided at its free end with a through shaft 45, on which are mounted two lugs 46, 47 attached to the side of the disc 19 facing the platform. The platform is also provided with a lug 48 in which is pivotably mounted a means 49 having its other end pivotably mounted on the disc 19. This means 49 may be such as a turnbuckle. With the aid of this described arrangement the disc 19 can be caused to move in the directions of the double arrow 50, for allowing the roller to assume different levels in relation to the platform 1. The movement of the boom round the rollers 12, 13, 14 can be relatively easily guided in this way, such that the boom in its flattened condition will be correctly advanced round the tubes 6, for coming at the right approach height relative to the turntable plate 3.

It should be understood that both the angular attitude of the roller 29, by the rotation of the disc 21 in relation to the disc 19, as well as the pivoting about the shaft 45 can be accomplished by hydraulic means, electric motors or other power driven means. What has been shown in the Figures is only to be regarded as simple solutions to illustrate the basic principle for setting the attitude of the roller 29.

Different detail embodiments can naturally be conceived within the scope of the invention. It is of course not necessary to form the winding bobin from conically arranged tubes, as is illustrated in the Figures, although this is a very suitable practical solution, and it is possible to obtain good reeling up of a boom by the arrangement of a roller 29 and rollers 12, 13, 14 in conjunction with some other kind of winding core. The rollers 12, 13, 14 can naturally be replaced by a single roller, but the practical disadvantage this may mean is that certain strains can occur in the material of the boom, when the floating body is pressed against a single surface with large force, and must flatten itself out during this operation to the shape it is to have when wound up on the bobin. The three rollers permit a certain amount of distribution of the material stresses in the boom during the flattening process, which takes place successively. There is also nothing to prevent more than three rollers being arranged.

The roller 29 can be braked by braking means known per se, and to avoid unnecessary complications braking means have not been illustrated in the figures.

We claim:

1. Apparatus in reeling up booms, including so-called self expanding booms, comprising: a vertically oriented winding means driven by a motor, the winding means being arranged for winding thereon of said boom in a flattened condition, first means defining at least one first roller oriented substantially parallel to the winding means and located upstream of and laterally adjacent to the winding means for cooperating in flattening the boom for winding on the winding means, and feed means defining a feed roller located upstream of said first roller (1) for guiding the boom during the winding operation and (2) for applying a braking force to the boom sufficient to press the boom against said first roller and thereby obtain said flattened condition of the boom as the boom is supplied to the winding means for winding thereon.

2. Apparatus as claimed in claim 1, wherein the feed roller is mounted in a structure actuable for adjusting the orientation of the feed roller in two planes at right angles to each other, said structure including two guide rolls having their shafts at right angles to that of said feed roller.

3. Apparatus as claimed in claim 1 in which the path of the boom runs over the feed roller and then through an acute angle around said first roller and then onto said winding means, the first roller being spaced from said winding means sufficient to closely clear the boom when fully wound on said winding means, said first roller and feed roller being spaced from each other along a line which is generally tangential to the winding means and to a boom substantially fully wound thereon.

4. Apparatus as claimed in claim 3 in which said first means comprises several said first rollers closely spaced to each other along the perimeter of said winding means along the path of the boom and located remote from said feed roller and the rotational axis of said winding means.

5. Apparatus in reeling up booms, including so-called self expanding booms, comprising a vertically arranged winding means suitably driven by a motor, the boom being arranged for winding onto said winding means in a flattened condition, one or more first rollers arranged substantially parallel to the winding means for coaction with the boom and arranged laterally in relation to the winding means, and a feed roller adapted for guiding the boom during the winding operation and for applying a braking force, as necessary, for pressing the boom into a compressed condition around said first rollers, the feed roller being mounted in a structure for adjustment of the feed roller in two planes at right angles to each other, said structure carrying the feed roller including two guide rolls having their shafts at right angles to that of the feed roller, the structure carrying the feed roller and guide rolls being attached to a second disc mounted on a central shaft, which in turn is attached to a first disc movably attached to a platform carrying said winding means.

6. Apparatus as claimed in claim 5, wherein both discs can be locked in different mutual angular positions, by a locking pin going through mutually registering holes in the discs.

7. Apparatus as claimed in claim 5, wherein the first disc is pivotably mounted to the platform with the aid of a shaft extending substantially parallel to the plane of the platform, there being means arranged between the platform and first disc for adjustment in the height of the first disc.

8. Apparatus as claimed in claim 5, wherein the cylindrical surface of the feed roller is provided with a friction coating.

9. Apparatus in reeling up booms, including so-called self expanding booms, comprising a vertically arranged winding means suitably driven by a motor, the boom being arranged for winding onto said winding means in a flattened condition, one or more first rollers arranged substantially parallel to the winding means for coaction with the boom and arranged laterally in relation to the winding means, and a feed roller adapted for guiding the boom during the winding operation and for applying a braking force, as necessary, for pressing the boom into a compressed condition around said first rollers, a platform carrying said winding means, said first rollers being journalled at their one ends in said platform and at their other ends in a yoke removably connected to the free upper end of the winding means by a mounting.

10. Apparatus as claimed in claim 9, wherein the boom is of the kind having a floating body portion, the first rollers being at least partially provided with a friction coating, at least at the portions coacting with the floating body portion of the boom.

11. Apparatus as claimed in claim 9, wherein the first rollers are freely rotatable.

12. Apparatus as claimed in claim 9, wherein the winding means comprise two or more tubular members upwardly kept together by a bolted joint going through a top plate carrying a journalling pin defining said mounting for said yoke, the bolted joint being removably attached at the other ends of the tubular members to a turntable plate mounted on the platform.

13. Apparatus as claimed in claim 12, wherein the tubular members are arranged conically, such that as a unit their radius of gyration is less at their upper ends than at their bottom ends.

14. Apparatus as claimed in claim 13, wherein said yoke is removable both from the journalling pin projecting up from the top plate, as well as from the first rollers for allowing lifting off said winding means of the boom bundle in its ready-reeled condition, the top plate together with the bolted joints being adapted for loosening from the turntable plate, whereby the conical attitude of the tubular members ceases, for facilitating such lifting off of the boom bundle.

15. Apparatus as claimed in claim 14, wherein the first rollers are also removably attached to the platform.

16. Apparatus as claimed in claim 9, wherein the winding means comprise a turntable plate rotatable on said platform, which turntable plate is provided with ridges on its upper side for reducing friction during winding up the boom, the ridges being oriented such that between pairs of them they form channels for the passage of rope or attachment bands for keeping the boom bundle together when it is wound up.

* * * * *